Patented Feb. 17, 1931

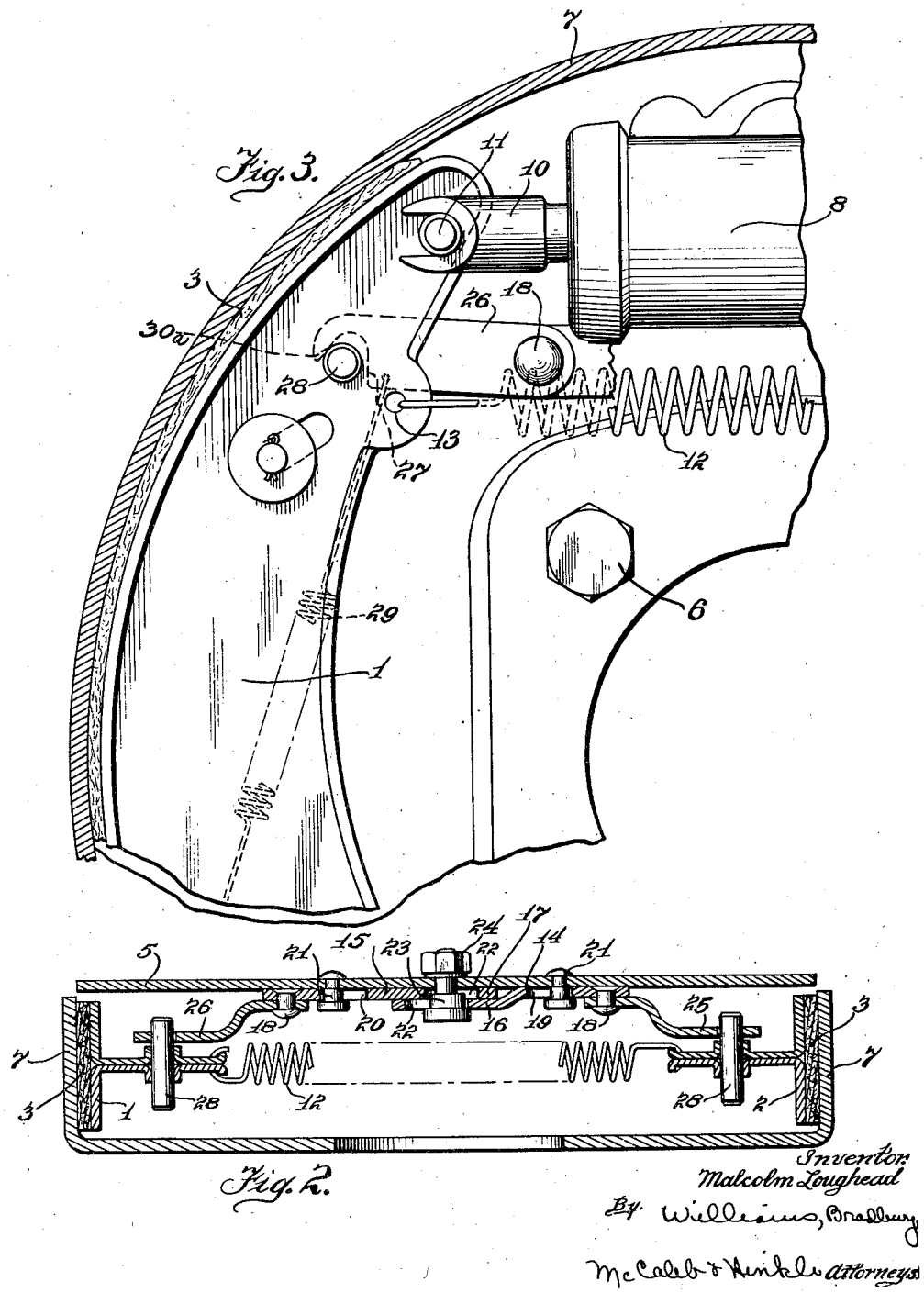

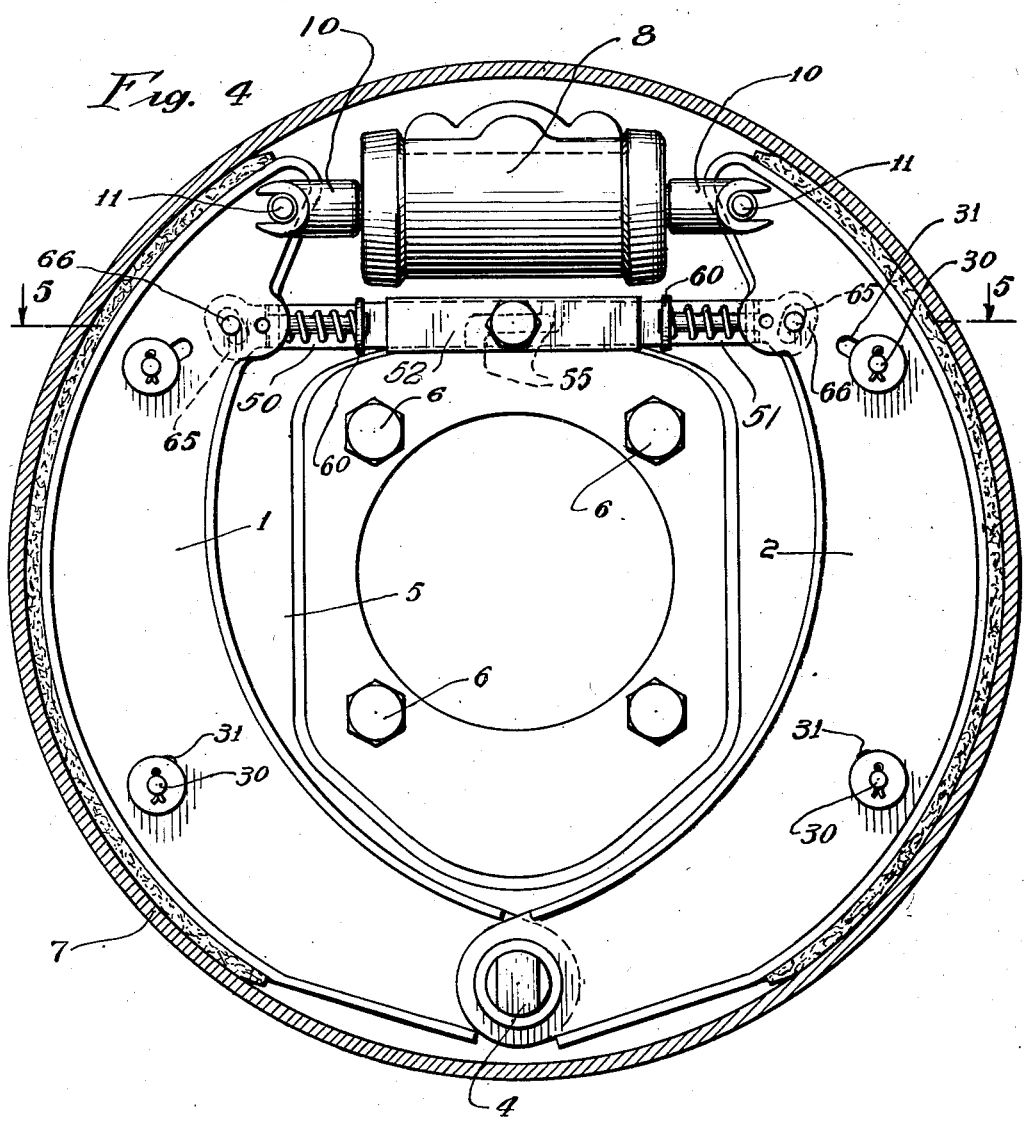

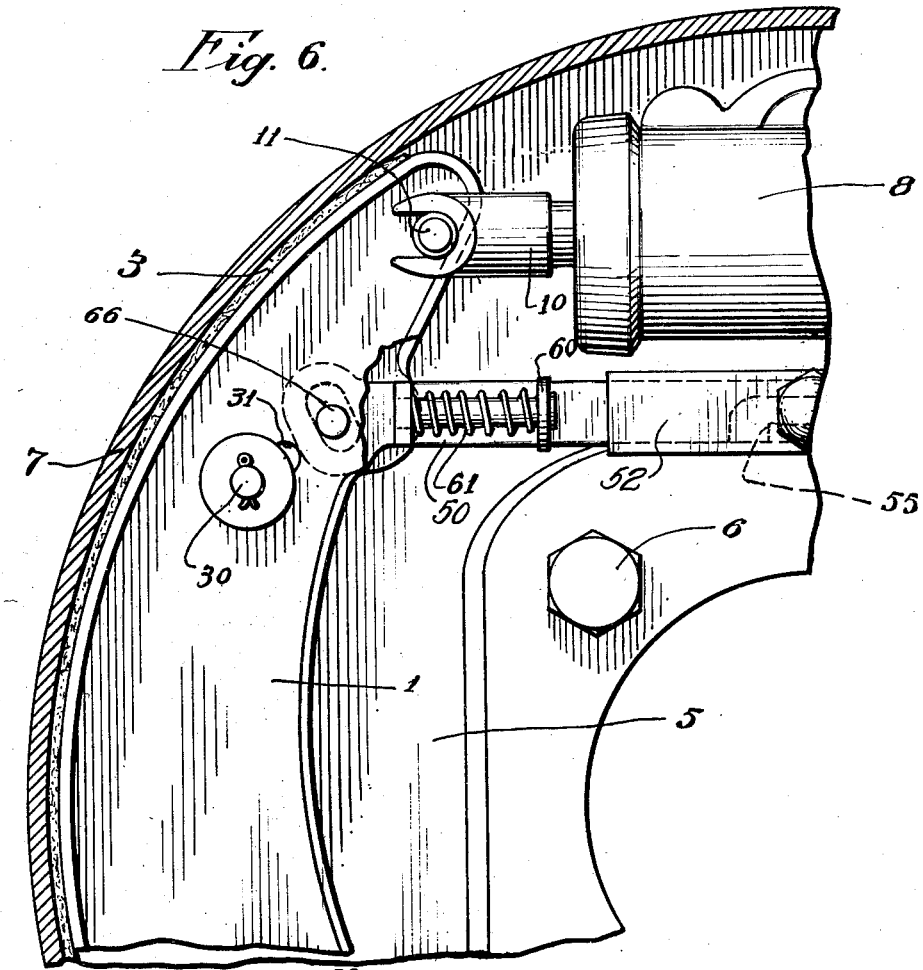

1,792,749

UNITED STATES PATENT OFFICE

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA

ADJUSTABLE STOP FOR BRAKE SHOES REISSUED

Application filed September 6, 1927. Serial No. 217,581.

My invention relates to improvements in adjustable stops for brake shoes and more particularly to that type of stop employed to limit the retraction of segmental brake shoes of the rigid type, each having one end mounted upon a pivotal support.

An object of the invention is to provide an adjustable stop of the character described which may be simply and accurately adjusted by the manipulation of a single adjustment bolt.

A further object of the invention is to provide an adjustable stop of the character described, which after it has been set permits a uniform and predetermined retractive movement of each of the brake shoes. This is important, since when the brakes are applied each shoe may then travel through the same distance in moving to engagement with the brake drum.

A further object of the invention is to provide an adjustable stop of the character described, in which means is provided for permitting full outward movement of the shoes, into engagement with the brake drum during the application of the brakes regardless of a decrease in thickness of the brake lining through wear.

Other objects and advantages of my invention will appear more fully from the following description and from the accompanying drawings, in which similar characters of reference indicate similar parts throughout the several views.

Figure 2 is a sectional view along the line 2—2 of Figure 1.

Figure 3 is a view of a fragmentary portion of Figure 1 illustrating the operation of the stop with the brake lining worn.

Figure 4 is a view similar to Figure 1 illustrating a modified form of the adjustable stop.

Figure 5 is a sectional view along the line 5—5 of Figure 4.

Figure 6 is an enlarged fragmentary view of a part of the mechanism illustrated in Figure 4, showing the manner in which the stop is adjusted.

Figure 1:
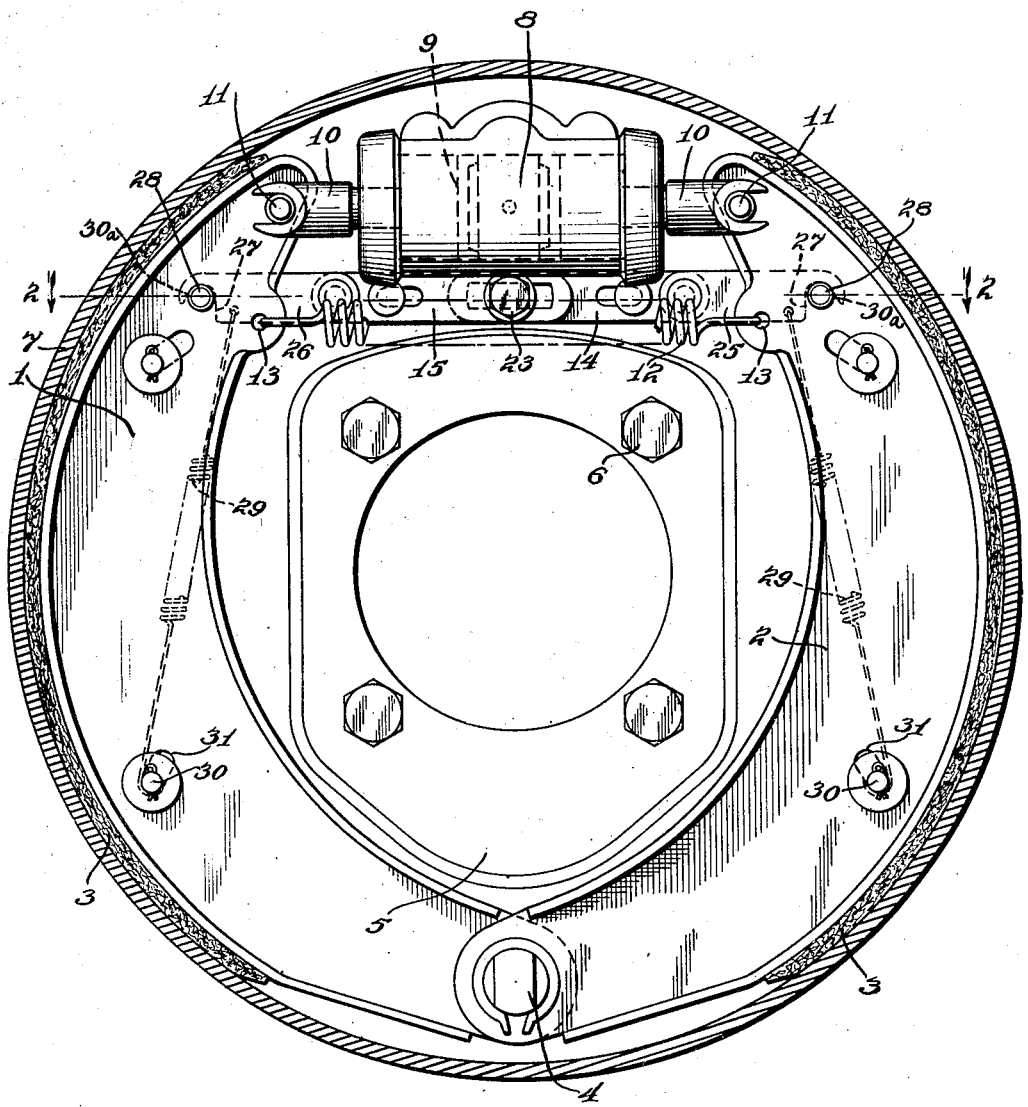
Figure 1 is a side elevation partly in section of an internally expanding brake mechanism of the rigid shoe type embodying the adjustable stop.

In carrying out my invention, I make use of the ordinary type of rigid shoe internal expanding brake mechanism consisting of a pair of shoes 1 and 2, each having brake lining 3 carried by the outer faces thereof. The shoes 1 and 2 are pivotally supported at their adjacent ends upon a brake shoe mounting pin 4. The pin 4 is secured to the dust pan or rear plate 5 of the brake assembly which is in turn mounted upon the axle housing of the vehicle by bolts 6.

A rigid annular brake drum carried by the vehicle wheel is shown at 7.

Means for moving the shoes 1 and 2 upon their pivotal support 4 to cause the linings 3 to engage with the internal surface of the brake drum 7 is provided in a hydraulic motor consisting of a cylinder 8 and a pair of pistons 9 carried therein, the pistons being connected by operating rods 10 to the adjacent free ends 11 of the shoes 1 and 2. In my prior Patent No. 1,468,600, issued September 18, 1923, I have fully described the construction and operation of the fluid motor 8.

A tension spring 12 is connected at its opposite ends to the free end of the brake shoes 1 and 2 at 13. Thus the spring exerts a constant force upon the shoes tending to retract them out of engagement with the drum.

All of the mechanism thus far described is well known in the art and is in use at the present time in the ordinary type of hydraulic brake mechanism.

The present invention relates to an adjustable stop for the shoes and in part consists of a pair of plates 14 and 15 (see Fig. 2). The plate 14 is offset so that a portion 16 overlies the adjacent outer portion 17 of the plate 15, the major portions of the plate lying in a common plane and contacting the inner face of the dust pan or rear face plate 5.

Each of the plates 14 and 15 is provided with slots 19 and 20, respectively, for receiving headed guide pins 21 which are securely fixed to the dust pan or rear face plate 5.

The overlying portions 16 and 17 of the plates are also provided with slots 22 for receiving a locking bolt 23 which projects through the rear face plate 5 and has a threaded nut 24 at the outer end thereof by means of which the plates 14 and 15 are drawn into close engagement with one another, and movement as between each other and the dust pan or rear face plate 5 thereby precluded.

Each of the plates 14 and 15 has pivotally mounted at its outer end at 18 stop members 25 and 26, respectively.

Each of the stop plates 25 and 26 has a portion adjacent to its outer end cut away to form an abutment surface 27 tangential to its pivotal support against which pins 28 extending transversely through the shoes 1 and 2 abut when the stopping members are in the position shown in Figure 1. Thus the retractive movement of the shoes by virtue of the spring 12 is determinable by the position of the plates 14 and 15 which carry the stopping members.

Means for yieldingly maintaining the stop members in the position shown in Figure 1 and engaging the top of the pins 28 is provided in a pair of tension springs 29, one for each of the stopping members and secured at one end thereto, the other end of which is fastened to a pin 30 projecting through a slot 31 in the shoes 1 and 2 respectively and carried by the dust pan or rear plate 5.

Means for assuring complete and proper application of the brake shoes should the lining become worn or should the adjustable stop mechanism be out of adjustment is provided for by forming that portion of the stop members 25 and 26 opposite to the abutment surface 27 with an inclined surface 30ª.

When the pins 28 engage with the inclined surface 30ª the stopping members must move on their centers 18 against the tension of the springs 29 and thus the lining on the shoes will properly engage with the brake drum 7.

In operation the adjustable stop is set by first unscrewing the nut 24 on the locking bolt 23 and in applying pressure to the fluid motor 8 by the actuation of a foot pedal forming a part of the motor operating system to cause the shoes 1 and 2 to move outwardly and closely engage the brake lining 3 with the brake drum 7.

The pins 28 carried by the shoes will cause the stop members 25 and 26, with their associated plates 14 and 15, to move outwardly therewith. This is because the tension springs 29 are sufficiently strong to hold the stop members down in engagement with the pins 28.

The nut 24 is then tightened so as to securely lock the plates 14 and 15 against movement with respect to one nut and with the dust pan or rear plate 5.

The adjustable stop is now in readiness for operation.

The spring 12 constantly exerts a retractile force upon the shoes 1 and 2 which causes them to move toward one another but limited in their movement by the engagement of the pins 28 with the adjustment surfaces 27 of the locking members. Thus, the retracted movement of the shoes is just sufficient to cause the linings 3 to properly clear the brake drum so that they will not drag.

Upon application of the brakes by pressure exerted at the fluid motor, the brake shoes will move to engage the linings with the drum and normally this movement is accompanied without movement of the stop members 25 and 26 upon their pivotal supports 18.

When, however, the brake lining becomes worn, the pins 28 will engage with the inclined surfaces 30ª of the stop members and cause the members to move against the tension of the springs 29 and thus yield to the greater force exerted upon the brake shoes by the fluid motor so that the shoes will properly engage with the brake drum.

In Figures 4 to 6 I have illustrated a modified form of the invention in which I employ reciprocable stop members in place of the pivoted stop members shown in the preferred form.

For the purpose of more clearly disclosing the stop mechanism I have eliminated the spring 12 from Figures 4 and 6 which is employed to draw the shoes 1 and 2 out of engagement with the brake drum 7.

In this form of the invention plates 50 and 51 are slidably mounted within a metal channel 52 which is drawn toward the rear face plate 5 by means of a bolt 53 and nut 54 which projects through the channel 52 and the face plate 5, the nut lying on the outer side of the face plate where it is readily accessible as for adjusting the stop. Tightening upon the nut secures the plates 50 and 51 against movement with respect to each other and the face plate 5.

The plates 50 and 51 each have elongated offset portions 55 at their adjacent ends which extend across opposite sides of the bolt 53 as shown in dotted lines in Figure 4, so as to assure maximum frictional engagement between the plates and the adjacent faces of the channel and rear face plate in the region of the bolt where pressure is greatest.

The free ends of the plates 50 and 51 extend forwardly in a plane, as shown at 56, perpendicular to the rear face plate. Reduced portions 57 of reciprocable stop members 58 project through openings 59 in the portions 56. Discs 60 are secured to the innermost ends of the reduced portions 57 of the stop members and compression springs 61 encompass these portions between the discs 60 and the forwardly extending portions 56 of the plates 50 and 51. Thus the stop members 58 are constantly urged inwardly toward the bolt 53 by the springs 61. Shoulders 63 formed at the junction of the reduced part and the major portion of the stop members serve to limit inward movement thereof.

The outermost ends of the stop members have elongated slots 65 therethrough extending in the direction of the brake shoe mounting pin 4. The purpose of providing elongated slots is to allow for slight variations in the distance between stop pins 66 projecting transversely through shoes 1 and 2 and the brake shoe mounting pin.

Sufficient clearance is allowed between the pins 66 and the adjacent walls of the slots 65 to permit movement of the brake shoes into and out of engagement with the drum 7.

In adjusting the stop mechanism the nut 54 is first loosened so that the plates 50 and 51 are thrust to move with respect to each other and the brakes are applied so as to cause the shoes 1 and 2 to move against the tension of the spring 12.

The shoes 1 and 2 in moving toward the brake drum and carrying their pins 66 therewith cause the plates 50 and 51 to move away from the bolt 53 upon contact of the pins 66 with the adjacent sides of the slots 65. At this time the springs 61 maintain the reciprocable stop members fully retracted with respect to their plates 50 and 51 since the bolt and nut 53 and 54 offer no resistance to the movement of the plates.

When the brakes have thus been applied, the nut 54 is tightened with the brakes still set.

When the brakes are released the shoes 1 and 2 will retract by virtue of the spring 12 a distance equal to the clearance between the pins 66 and the slots 65.

If now the brake linings 3 become so worn as to necessitate engagement of the pins 66 with the adjacent sides of the slots 65 when the brakes are applied, the brakes are still free to adequately set by virtue of the springs 61 which yield and permit reciprocable movement of the stop members 58.

What I claim as new and desire to secure by Letters Patent, is:

1. In a brake of the class described, the combination of a drum, a brake shoe engageable with said drum, means for forcing said shoe against said drum, a stationary support, a lost motion connection between said shoe and said support including a plurality of relatively movable elements, resilient means tending to prevent lost motion in said connection, said connection being adapted to limit the retractile movement of said shoe, and releasable means for securing one element of said connection to said support, whereby the position of said element may be adjusted by the movement of said shoe transmitted through said connection.

2. In a brake of the class described, the combination with a drum, brake shoes engageable with said drum, means for forcing said shoes against said drum, a stationary support, a lost motion connection between each of said shoes and said support including a plurality of relatively movable elements, resilient means tending to prevent lost motion in said connections, said connections being adapted to limit the retractive movement of said shoes, and releasable means for securing one element of each of the connections to said support whereby the position of said elements may be adjusted by the movement of said shoes transmitted through said connections.

3. An adjustable stop for a vehicle wheel brake shoe comprising stop members, a movable support for said stop members, yielding means for holding the stop members in engagement with the shoe so that the stop member and support will move with the shoe, means for locking the support against movement and other means forming part of the stop member of the shoe for moving the stop member against said yielding means upon excessive outward movement of the shoe.

4. The combination with the brake shoe of a vehicle wheel brake mechanism, a stop member for engaging with the shoe to limit the retractive movement thereof, a movable support for the stop member, means for yieldingly engaging the stop member with the shoe whereby the stop member and support member move when the shoe is applied for adjustment of the stop and means for locking the support against movement, said stop member being constructed so as to move against said yielding means upon excessive outward movement of the shoe.

5. An adjustable stop for vehicle wheel brake shoes comprising stop members, movable supports for said stop members, yielding means for holding the stop members in engagement with the brake shoes so that the stop members and support will move with the shoes, for adjustment of the stop members, means for locking the supports against movement and other means forming part of the stop members for moving the stop members against said yielding means upon excessive outward movement of the shoes.

6. An adjustable stop for vehicle wheel brake shoes comprising stop members, a movable support, said stop members being movably mounted upon the support, means permitting the stop members and support to move with the shoes for adjustment thereof, means for locking the support against movement whereby the stop members may limit the retractive movement of the shoes, said stop members being formed so as to shift in their relationships with the shoes and permit excessive outward movement of the shoes upon application of the brake as when the shoes have become worn.

7. In a device of the class described, the combination of a drum, a shoe pivotally mounted for engagement therewith, a relatively stationary support, a limiting stop connection between said shoe and said support, resilient means associated with said connection, said connection being adapted to positively limit retractile movement of said shoe and resiliently prevent outward movement thereof, releasable means for securing said connection to said support, said resilient means being operative to semi-rigidly connect said shoe with said connection, whereby said connection may be moved to adjusted position by means of said shoe when said connection is free to move relative to said support.

8. In a device of the class described, a brake drum, a pivotally mounted brake shoe engageable therewith, and adjustable means for limiting the retractile movement of said brake shoe comprising a movable stop to positively limit the retractile movement of the shoe, said stop during adjustment being free to move with said shoe, means for releasably clamping said stop in its adjustable position, and other means including a spring associated with the stop for altering the connection between said shoe and said stop upon excessive outward movement of the shoe during brake application as when the shoe has become worn.

9. Brake shoe stop mechanism comprising a brake shoe, a lining therefor, a support for the brake shoe, a member carried by the movable brake shoe, an adjustable member carried by the brake shoe support, the latter member carrying an abutment for limiting the retractile movement of said brake shoe, said member also having an opposed abutment positioned to be engaged when the brake shoe is in its actuating position, the latter abutment having yielding engagement with said brake shoe, whereby a superior force may cause the brake shoe to move beyond the position of engagement with said opposed abutment as the brake shoe lining wears.

In witness whereof, I hereunto subscribe my name this 31st day of August, 1927.

MALCOLM LOUGHEAD.